E. WILDER.
Device for Driving Horses.
No. 200,781. Patented Feb. 26, 1878.
Fig. 1.
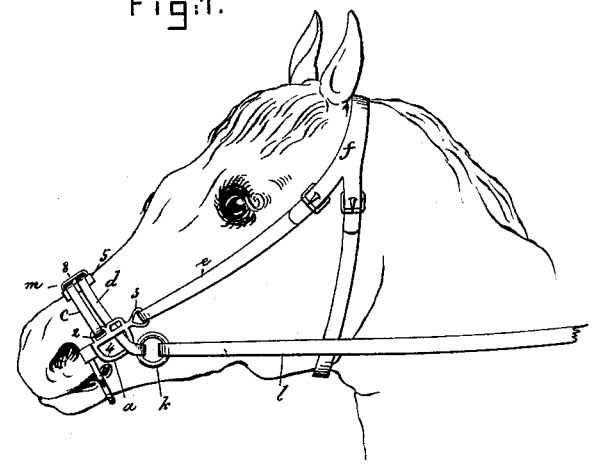
Fig. 2.
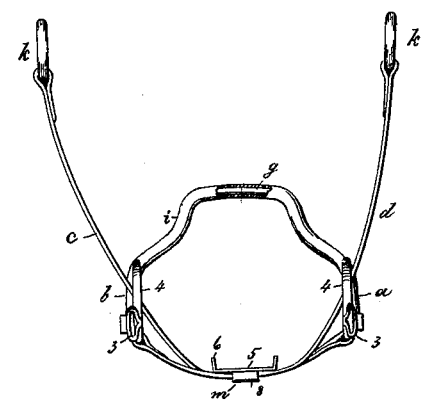
Fig. 4.
Fig. 3.
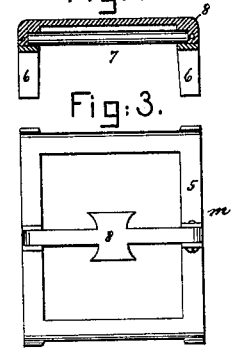
Witnesses.
W. J. Pratt.
L. A. Baxter
Inventor.
Ezra Wilder
by Crosby Gregory Attys

UNITED STATES PATENT OFFICE.

EZRA WILDER, OF SOUTH HINGHAM, MASSACHUSETTS.

IMPROVEMENT IN DEVICES FOR DRIVING HORSES.

Specification forming part of Letters Patent No. 200,781, dated February 26, 1878; application filed January 23, 1878.

*To all whom it may concern:*

Be it known that I, EZRA WILDER, of South Hingham, county of Plymouth, State of Massachusetts, have invented an Improvement in Device for Driving Horses, of which the following is a specification:

This invention relates to a device for driving horses, such device being arranged to clasp the nose and jaw of the horse more or less hard, according to the power exerted upon the reins.

Bits for driving-bridles as now commonly made present either a stiff, a jointed, or a flexible bar, which rests in the mouth of the horse, and the pull to guide or hold the horse is exerted in his mouth. A bit placed in the mouth of a horse frets him, and if he is young and spirited, or has a tender mouth, he constantly tries to get the bit from his mouth.

This my device for driving horses is intended as a substitute for the bit now commonly used. With it I avoid introducing a bit into the horse's mouth, so that the horse is enabled to keep his mouth closed and his tongue in its natural position, instead of being pressed down or held up by the bar. Further, I obviate all necessity of opening the horse's mouth for the introduction of the bit—an operation often painful to the horse, one from which he shrinks, and one disagreeable to the person.

My driving device is composed of cheek-pieces or equivalents, a jaw-holder, and nose-bands secured to one cheek-piece and crossed over the nose to the other cheek-piece, where the nose-bands are connected with the reins.

Figure 1 represents, in side view, a horse's head provided with one of my driving devices; Fig. 2, a top view of a driving device; Fig. 3, a top view of the nose-bridge, and Fig. 4 a section thereof.

The driving device illustrated in this instance of my invention has cheek-pieces *a b*, provided with loops 2, to which is secured one end of each nose-band *c d*, with loops 4, through which the free end of each nose-band, after passing over the nose, is extended, as shown, by the band *d*, Fig. 1, and loops 3, to which are secured suitable straps *e*, connecting with the top straps *f*. The cheek-pieces, at opposite sides of the mouth, are connected by means of a jaw-holder composed of a metallic rod, *g*, bent, preferably, substantially as shown in Fig. 2, the ends of the bar being preferably screwed into the cheek-pieces or fastened by a pin, so that the cheek-pieces and jaw-holder can be separated for the application to the jaw-holder of an india-rubber or other covering, *i*, less hard than iron. Preferably I shall employ india-rubber tubing for this covering.

If the jaw-holder should be covered by means of a fibrous or leather cover sewed or wrapped about it and stitched, or be cemented thereon, then the jaw-holder and cheek-pieces may be fixed.

Each nose-band has at its free end a ring, *k*, to which is attached one of the driving-reins *l*. The nose-bridge *m* is composed of a frame, 5, to rest upon the nose, lugs 6 to prevent the frame moving, so as to meet the cheek-pieces, a roller, 7, and a cap, 8, to hold it in place, the bands extending between the roller and cap, as shown. This nose-bridge prevents the bands from bearing upon the nose and wearing it, as they would be apt to do in being drawn across the nose by the reins. The roller obviates friction of the bands; but it might be omitted. This nose-bridge *m* may be made of metal, covered with any soft substance, as cloth or leather, or may be made of india-rubber molded into the desired shape.

In practice I find that the nose-bridge remains in position at the top of the nose of the horse.

If desired, the cap 8 may have pins to enter slots in the bands, so that the nose-bridge cannot move far out of position laterally.

The driver by pulling upon the reins is enabled to draw the jaw-holder closely against the under jaw and the nose bands and bridge tightly down upon the nose, thereby clasping the nose and jaw firmly, enabling the driver to pull the head to one side or the other easily, and with greater certainty and power than if only a bit were used in the mouth.

The horse may eat or drink freely without removing the device from his head, and when standing still or moving will be more quiet and manageable than if annoyed by a bit in his mouth.

With this device a horse will not froth or foam at the mouth, will not extend his tongue, and his mouth cannot be made sore.

I do not wish to limit this my invention to the particular shape of the cheek-pieces, as they may be shaped according to fancy of the manufacturer, and may be plated or otherwise finished, as are bridle-bits.

If desired, the cheek-pieces may be connected under the chin or jaw by means of a safety strap or chain, so that the horse could be controlled even should the jaw-holder be broken.

I claim—

1. As an improved article of manufacture, a driving device composed of a jaw-holder, nose-bands, and cheek-pieces, to operate when the nose-bands are drawn upon by driving-reins, substantially as described.

2. The cheek-pieces and detachable jaw-holder, bent to encompass the lower jaw and to connect the cheek-pieces, thereby dispensing with the usual mouth-piece, in combination with a covering for the jaw-holder, substantially as described.

3. The combination, with the cheek-pieces, jaw-holder, and nose-bands, of a nose-bridge for the bands, substantially as described.

In testimony whereof I have signed my name to this specification in the presence of two subscribing witnesses.

EZRA WILDER.

Witnesses:
G. W. GREGORY,
L. A. BAXTER.